(12) United States Patent
Teigne et al.

(10) Patent No.: US 12,337,984 B2
(45) Date of Patent: Jun. 24, 2025

(54) ACOUSTIC PANEL COMPRISING AT LEAST TWO CELLULAR STRUCTURES WHICH ARE NESTED ONE INSIDE THE OTHER, AIRCRAFT HAVING AT LEAST ONE SUCH ACOUSTIC PANEL

(71) Applicant: Airbus Operations SAS, Toulouse (FR)

(72) Inventors: Manuel Teigne, Toulouse (FR); Florian Ravise, Toulouse (FR); Laurent Caliman, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 295 days.

(21) Appl. No.: 18/191,185

(22) Filed: Mar. 28, 2023

(65) Prior Publication Data
US 2023/0312121 A1    Oct. 5, 2023

(30) Foreign Application Priority Data
Apr. 1, 2022 (FR) ........................ 2202974

(51) Int. Cl.
*B64D 33/02* (2006.01)
*B64D 33/04* (2006.01)
*G10K 11/172* (2006.01)

(52) U.S. Cl.
CPC ............. *B64D 33/02* (2013.01); *B64D 33/06* (2013.01); *G10K 11/172* (2013.01); *B64D 2033/0206* (2013.01)

(58) Field of Classification Search
CPC ................... B64D 33/02; B64D 33/06; B64D 2033/0206; G10K 11/172; F02C 7/045; F02C 7/24; F02K 1/827
See application file for complete search history.

(56) References Cited

U.S. PATENT DOCUMENTS 6,328,258 B1    12/2001  Porte
9,352,844 B2 *   5/2016  Porte ...................... B64D 33/02
(Continued)

FOREIGN PATENT DOCUMENTS

EP     3552951 A1     10/2019
FR     3100918 A1 *    3/2021
(Continued)

OTHER PUBLICATIONS

French Search Report for French Patent Application No. 2202974 dated Nov. 1, 2022; priority document.

*Primary Examiner* — Jeremy A Luks
(74) *Attorney, Agent, or Firm* — Greer, Burns & Crain, Ltd.

(57) ABSTRACT

An acoustic panel including first and second cellular structures, the first cellular structure including a set-back portion to form a recess dimensioned to accommodate the second cellular structure such that first faces of the first and second cellular structures, in contact with a first, acoustically resistive layer, are coplanar and that first edge faces of the first and second cellular structures are coplanar when the second edge face of the second cellular structure is in contact with the set-back portion. By virtue of the set-back portion, the first and second cellular structures are positioned correctly with respect to one another, thus contributing to an optimization of the acoustic treatment.

11 Claims, 1 Drawing Sheet

(56) References Cited

U.S. PATENT DOCUMENTS

| | | | |
|---|---|---|---|
| 10,940,955 B2 * | 3/2021 | Lacko | ................... F02K 1/827 |
| 2010/0148001 A1 | 6/2010 | Hoetzeldt et al. | |
| 2014/0326536 A1 | 11/2014 | Vauchel et al. | |
| 2019/0309682 A1 | 10/2019 | Porte et al. | |
| 2024/0217667 A1 * | 7/2024 | Gonidec | ............. G10K 11/172 |

FOREIGN PATENT DOCUMENTS

| | | | | |
|---|---|---|---|---|
| GB | 1490923 A | | 11/1977 | |
| WO | WO-2011086273 A1 * | 7/2011 | ............. B64D 33/02 |

* cited by examiner

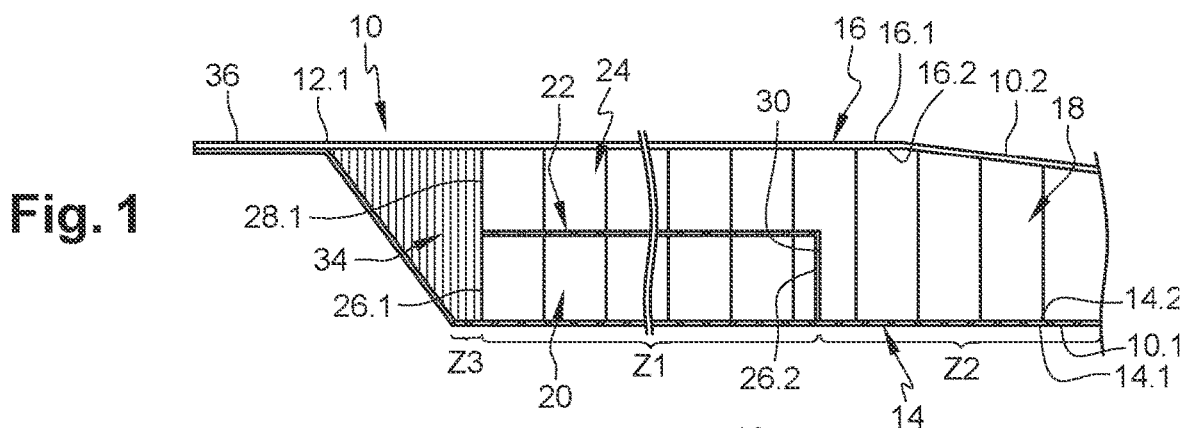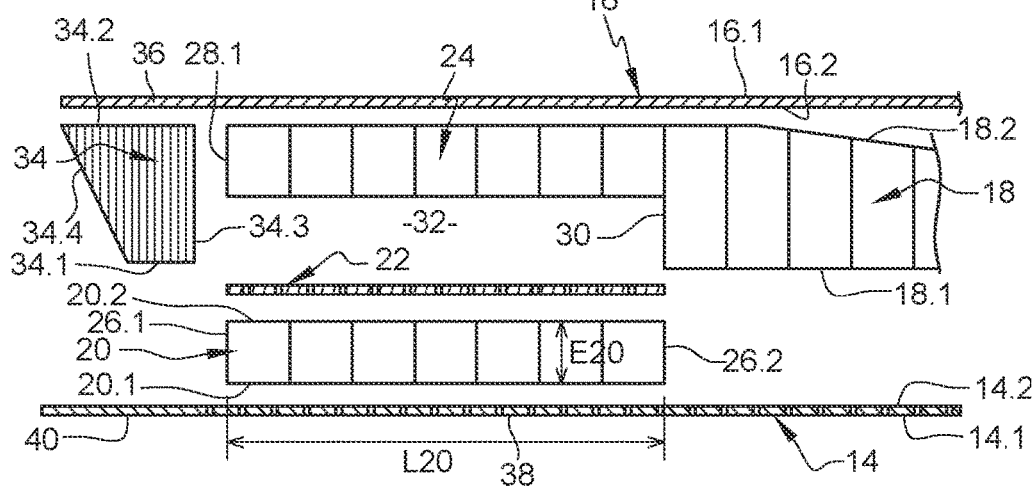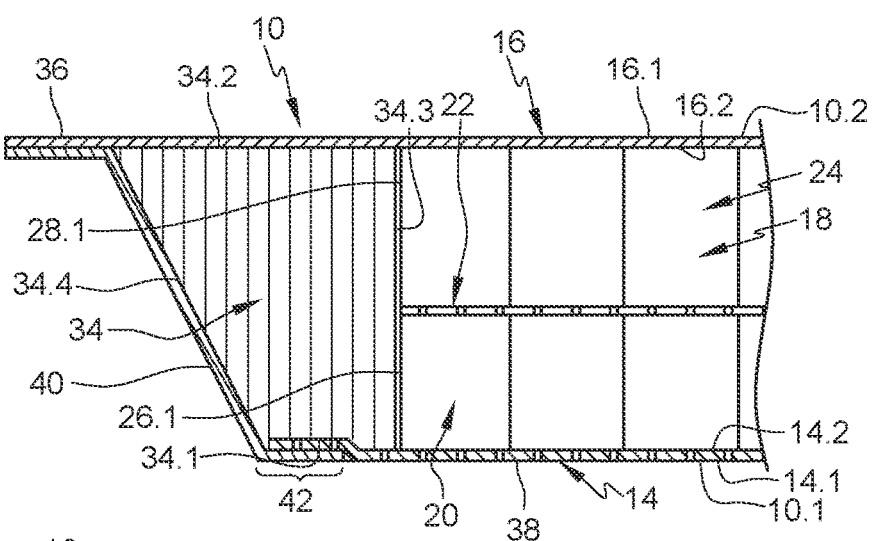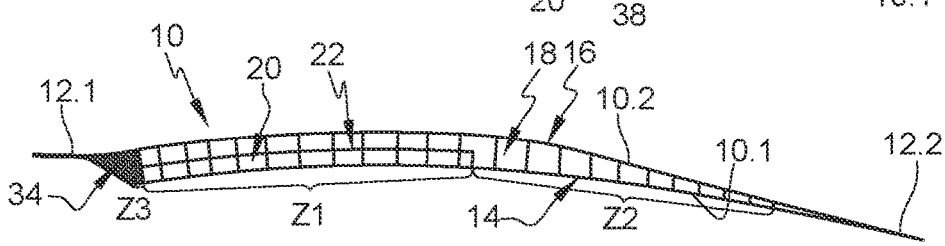

ACOUSTIC PANEL COMPRISING AT LEAST TWO CELLULAR STRUCTURES WHICH ARE NESTED ONE INSIDE THE OTHER, AIRCRAFT HAVING AT LEAST ONE SUCH ACOUSTIC PANEL

CROSS-REFERENCES TO RELATED APPLICATIONS

This application claims the benefit of the French patent application No. 2202974 filed on Apr. 1, 2022, the entire disclosures of which are incorporated herein by way of reference.

FIELD OF THE INVENTION

The present application relates to an acoustic panel comprising at least two cellular structures which are nested one inside the other, and to an aircraft having at least one such acoustic panel.

BACKGROUND OF THE INVENTION

According to one embodiment, an acoustic panel comprises first and second superposed cellular structures that are positioned between a reflective layer (impermeable to sound waves) and a first, acoustically resistive layer (porous to sound waves) in contact with an exterior environment in which sound waves propagate, a second porous, acoustically resistive layer being interposed between the first and second cellular structures.

According to one configuration, the first and second cellular structures are in the form of plates which comprise planar faces oriented toward one another.

In view of this geometry, it is difficult to position the first and second cellular structures correctly with respect to one another and to maintain this position in order to obtain optimal operation of the acoustic treatment.

SUMMARY OF THE INVENTION

The present invention aims to overcome all or some of the drawbacks of the prior art.

To that end, one subject of the invention is an acoustic panel comprising a first longitudinal edge, a first, acoustically resistive layer, a second, reflective layer, at least first and second cellular structures interposed between the first and second layers, and at least a third, acoustically resistive layer interposed between the first and second cellular structures, the first, acoustically resistive layer and the second, reflective layer being contiguous at the first longitudinal edge. The first cellular structure has a first face, a second face that is opposite to the first face and that is in contact with the second, reflective layer, and a first edge face oriented toward the first longitudinal edge of the acoustic panel, the second cellular structure comprising a first face in contact with the first, acoustically resistive layer and a second face opposite to the first face, and also first and second edge faces connecting the first and second faces, the first edge face of the second cellular structure being oriented toward the first longitudinal edge of the acoustic panel.

According to the invention, the first cellular structure comprises a set-back portion which extends from the first face in the direction of the second face and which forms a recess dimensioned to accommodate the second cellular structure and the third, acoustically resistive layer, the second cellular structure being positioned in the recess in such a way that the first faces of the first and second cellular structures are coplanar and in contact with the first, acoustically resistive layer, that the first edge faces of the first and second cellular structures are coplanar and that the second edge face of the second cellular structure is in contact with the set-back portion.

According to the invention, the first and second cellular structures are nested one inside the other and positioned correctly with respect to one another by virtue of the set-back portion, thus contributing to the optimization of the acoustic treatment.

According to another feature, the acoustic panel comprises at least one reinforcement interposed between the first, acoustically resistive layer and the second, reflective layer, between the first longitudinal edge of the acoustic panel and the first edge faces of the first and second cellular structures; the reinforcement having a first surface extending in a plane common to the first face of the second cellular structure, a second surface extending in a plane common to the second face of the first cellular structure, a third surface in contact with the first edge faces of the first and second cellular structures, and a fourth, inclined surface connecting the first and second surfaces.

According to another feature, the first surface has a transverse dimension greater than 1 cm and smaller than 5 cm.

According to another feature, the reinforcement is a cellular structure which has cells opening out at the first and second surfaces of the reinforcement.

According to another feature, the cells of the reinforcement have a cross section smaller than that of the first and second cellular structures.

According to another feature, the cells of the reinforcement have a width of between 3 and 6 mm.

According to another feature, the second, reflective layer comprises an extension which extends beyond the second surface of the reinforcement.

According to a first embodiment, the first layer extends continuously over the first and second cellular structures, the fourth surface of the reinforcement and the extension of the second, reflective layer.

According to a second embodiment, the first layer comprises a first, acoustically resistive part which extends over the first and second cellular structures and at least partially over the first surface of the reinforcement, and a second part which extends at least partially over the first surface of the reinforcement, over the fourth surface of the reinforcement and over the extension of the reflective layer, the first and second parts having a zone of overlap in line with the first surface of the reinforcement.

According to another feature, the first and second cellular structures have cells having a width greater than or equal to 12.7 mm.

Another subject of the invention is an aircraft comprising at least one acoustic panel according to one of the preceding features.

BRIEF DESCRIPTION OF THE DRAWINGS

Further features and advantages will become apparent from the following description of the invention, which is given solely by way of example, with reference to the appended drawings, in which:

FIG. 1 is a cross section of a part of an acoustic panel, illustrating one embodiment of the invention, FIG. 2 is a cross section of the different elements of the acoustic panel visible in FIG. 1, prior to assembly thereof, FIG. 3 is a cross section of an edge of an acoustic panel, illustrating one embodiment of the invention, FIG. 4 is a cross section of a door of a thrust reverser of an aircraft, illustrating one embodiment of the invention.

DETAILED DESCRIPTION OF THE PREFERRED EMBODIMENTS

According to one embodiment visible in FIGS. 1 and 2, an acoustic panel 10 comprises a first face 10.1 in contact with an environment in which sound waves propagate, and a second face 10.2 opposite to the first face 10.1. This acoustic panel 10 extends from a first longitudinal edge 12.1 as far as a second longitudinal edge 12.2.

According to one application, the acoustic panel 10 forms a door of a thrust reverser of an aircraft propulsion assembly. Of course, the invention is not limited to this application. Thus, the acoustic panel 10 may be used in different zones of an aircraft. Irrespective of the applications, an aircraft comprises at least one acoustic panel 10.

The acoustic panel 10 comprises at least first and second zones Z1, Z2.

According to one configuration, the first zone Z1 is positioned between the first longitudinal edge 12.1 of the acoustic panel 10 and the second zone Z2. The second zone Z2 is positioned between the second longitudinal edge 12.2 of the acoustic panel 10 and the first zone Z1, the first and second zones Z1, Z2 being contiguous.

According to one embodiment, the acoustic panel 10 comprises a first, acoustically resistive layer 14, porous to sound waves, which extends at least over the first and second zones Z1, Z2 and which has an outer face 14.1 forming the first face 10.1 of the acoustic panel 10 and an inner face 14.2 opposite to the outer face 14.1. The acoustic panel 10 also comprises a second, reflective layer 16 which extends at least over the first and second zones Z1, Z2 and which has an outer face 16.1 forming the second face 10.2 of the acoustic panel 10 and an inner face 16.2 opposite to the outer face 16.1.

In the second zone Z2, the acoustic panel 10 comprises, starting from the first face 10.1 of the acoustic panel 10, the first, acoustically resistive layer 14, a first cellular structure 18 and the second, reflective layer 16. In this second zone Z2, the acoustic panel 10 comprises a single cellular structure 18. The first cellular structure 18 has a first face 18.1 in contact with the inner face 14.2 of the first, acoustically resistive layer 14 and a second face 18.2 in contact with the inner face 16.2 of the second, reflective layer 16.

In the first zone Z1, the acoustic panel 10 comprises, starting from the first face 10.1, the first, acoustically resistive layer 14, a second cellular structure 20, at least a third, acoustically resistive layer 22 (porous to sound waves), a third cellular structure 24 and the second, reflective layer 16.

The second cellular structure 20 comprises a first face 20.1 in contact with the inner face 14.2 of the first, acoustically resistive layer 14 and a second face 20.2 in contact with the third, acoustically resistive layer 22. The second cellular structure 20 has a thickness E20 corresponding to the distance separating the first and second faces 20.1, 20.2.

The second cellular structure 20 comprises a first edge face 26.1 oriented toward the first longitudinal edge 12.1 of the acoustic panel 10 and a second edge face 26.2 opposite to the first edge face 26.1, the first and second edge faces 26.1, 26.2 connecting the first and second faces 20.1, 20.2. The second cellular structure 20 has a transverse dimension L20 corresponding to the distance separating the first and second edge faces 26.1, 26.2.

According to a particular feature of the invention, the first and third cellular structures 18, 24 form the one same single cellular structure, called first cellular structure 18 hereinafter. In the first zone Z1, the second face 18.2 of the first cellular structure 18 is also in contact with the reflective layer 16. This first cellular structure 18 comprises a first edge face 28.1 oriented toward the first longitudinal edge 12.1 of the acoustic panel 10.

This first cellular structure 18 comprises a set-back portion 30 which extends from the first face 18.1 in the direction of the second face 18.2 and which forms a recess 32 dimensioned to accommodate the second cellular structure 20 and the third, acoustically resistive layer 22.

Thus, the recess 32 has a first dimension that is measured perpendicularly with respect to the first, acoustically resistive layer 14 and that is substantially equal to the sum of the thickness of the third, acoustically resistive layer 22 and of the thickness E20 of the second cellular structure 20 such that the first face 20.1 of the second cellular structure 20 is substantially coplanar with the first face 18.1 of the first cellular structure 18.

The recess 32 has a second dimension that is measured parallel to the first, acoustically resistive layer 14 and perpendicularly with respect to the first longitudinal edge 12.1 of the acoustic panel 10 and that is substantially equal to the transverse dimension L20 of the second cellular structure 20 such that the first edge faces 26.1, 28.1 of the first and second cellular structures 18, 20 are substantially coplanar when the second edge face 26.2 of the second cellular structure 20 is in contact with the set-back portion 30.

According to the invention, the first and second cellular structures 18, 20 are nested one inside the other and positioned correctly with respect to one another by virtue of the set-back portion 30, thus contributing to the optimization of the acoustic treatment, the cells of the first cellular structure 18 being substantially aligned with those of the second cellular structure 20.

According to one mode of operation, the first cellular structure 18 is ultrasonically machined to obtain the set-back portion 30 and the recess 32.

According to one embodiment, each of the first and second cellular structures 18, 20 has cells with a large cross section. For the present application, a cell has a large cross section if its diameter or if the smallest distance separating two opposite faces of a cell, called width, is greater than or equal to 12.7 mm. According to one configuration, the cells of the first and second cellular structures 18, 20 have a width of the order of 19 mm. The cells of the first and second cellular structures 18, 20 have substantially the same cross section.

According to a first arrangement visible in FIG. 1, the first and second faces 10.1, 10.2, 18.1, 18.2, 20.1, 20.2 of the acoustic panel 10 and of the first and second cellular structures 18, 20 are planar.

According to a second arrangement visible in FIG. 4, the first and second faces 10.1, 10.2, 18.1, 18.2, 20.1, 20.2 of the acoustic panel 10 and of the first and second cellular structures 18, 20 are curved.

According to one embodiment, the first, acoustically resistive layer 14 and the second, reflective layer 16 are contiguous at each of the first and second longitudinal edges 12.1, 12.2 of the acoustic panel 10.

According to one embodiment, at the second longitudinal edge 12.2 of the acoustic panel 10, the first and second faces of the first cellular structure 18 are not parallel to one another, but form between them an angle of less than 45°.

According to one embodiment, the acoustic panel 10 comprises at least one reinforcement 34 interposed between the first, acoustically resistive layer 14 and the second, reflective layer 16, between the first longitudinal edge 12.1 of the acoustic panel 10 and the first and second cellular structures 18, 20. This reinforcement 34 has a first surface 34.1 situated approximately in the continuation of the first face 20.1 of the second cellular structure 20, a second surface 34.2 situated in the continuation of the second face 18.2 of the first cellular structure 18, a third surface 34.3 in contact with the first edge faces 26.1, 28.1 of the first and second cellular structures 18, 20, and a fourth, inclined surface 34.4 connecting the first and second surfaces 34.1, 34.2. The first surface 34.1 has a transverse dimension smaller than that of the second surface 34.2.

In the presence of a reinforcement 34, the first and second cellular structures 18, 20 do not need to have inclined edge faces 26.1, 28.1, thus contributing to the avoidance of acoustic treatment losses. In addition, the second cellular structure 20 is perfectly immobilized with respect to the first cellular structure 18, between the set-back portion 30 and the reinforcement 34. Thus, the first and second cellular structures 18, 20 are positioned correctly with respect to one another and retain this positioning, thus contributing to the optimization of the acoustic treatment.

The first surface 34.1 has a transverse dimension greater than 1 cm, and smaller than 5 cm. This first surface 34.1 has to have the smallest possible transverse dimension so as to not alter the acoustic treatment too greatly and has to be of sufficient width to avoid a phenomenon of crushing the first and second cellular structures 18, 20 with wide cells.

The reinforcement 34 is a third cellular structure which has cells opening out at the first and second surfaces 34.1, 34.2. The cells of the reinforcement 34 have a cross section smaller than that of the first and second cellular structures 18, 20. The cells of the reinforcement 34 have a width smaller than 11 mm. According to one configuration, the cells of the cellular structure of the reinforcement 34 have a width of between 3 and 6 mm.

In the presence of a reinforcement 34 in the form of a cellular structure, the acoustic panel 10 comprises a third zone Z3 in line with the reinforcement 34. This zone Z3 can ensure an acoustic treatment if the first layer 14 is, in line with the reinforcement 34, acoustically resistive and configured to allow sound waves to pass through.

According to one embodiment, the second, reflective layer 16 is shaped like the second face 10.2 of the acoustic panel 10. In the presence of a reinforcement 34, the second, reflective layer 16 comprises an extension 36 which extends beyond the second surface 34.2 of the reinforcement 34.

According to a first embodiment visible in FIG. 1, the first layer 14 extends continuously over the first and second cellular structures 18, 20, the fourth surface 34.4 of the reinforcement 34 and the extension 36 of the second, reflective layer 16.

According to a second embodiment visible in FIG. 3, the first layer 14 comprises a first, acoustically resistive part 38 which is porous to sound waves and which extends over the first and second cellular structures 18, 20 and at least partially over the first surface 34.1 of the reinforcement 34, and a second part 40 which may be non-porous and which extends at least partially over the first surface 34.1 of the reinforcement, over the fourth surface 34.4 of the reinforcement 34 and over the extension 36 of the reflective layer 16, the first and second parts 38, 40 having a zone of overlap 42 in line with the first surface 34.1 of the reinforcement 34, in which zone of overlap they are closely connected. Thus, the second part 40 ensures the connection between the first, acoustically resistive part 38 and the second, reflective layer 16.

According to the invention, the first and second cellular structures 18, 20 have simple shapes. The reinforcement 34 conforms to the shapes of the first and second cellular structures and of the first and second layers 14, 16. The reinforcement 34 has all of the complexities of the end of the panel (in terms of curvature, of cutouts, of slopes). Thus, the reinforcement 34 concentrates the complex shapes and the singularities of the acoustic panel 10.

According to one mode of operation, the first and second cellular structures 18, 20 and the reinforcement 34 are produced independently of one another. The first cellular structure 18 and the reinforcement 34 are ultrasonically machined to the final dimensions, then the first and second cellular structures 18, 20, the reinforcement 34 and the third, acoustically resistive layer 22 are assembled in order to obtain a structure to which the second, reflective layer 16 and the first, acoustically resistive layer 14 are attached.

According to another mode of operation, the first and second cellular structures 18, 20, the reinforcement 34 and the third, acoustically resistive layer 22 are assembled, then ultrasonically machined to the final dimensions once assembled.

Irrespective of the mode of operation, the first, acoustically resistive layer 14 and the second, reflective layer 16 are positioned after the assembly of the first and second cellular structures 18, 20, of the reinforcement 34 and of the third, acoustically resistive layer 22.

The second, reflective layer 16 may be obtained by drape forming or by a technique for placing fibers on the assembly of the first and second cellular structures 18, 20, of the reinforcement 34 and of the third, acoustically resistive layer 22.

According to the first embodiment, the entire first layer 14 is obtained by drape forming or by a technique for placing fibers on the assembly of the first and second cellular structures 18, 20, of the reinforcement 34 and of the third, acoustically resistive layer 22.

According to the second embodiment, the first part 38 of the first, acoustically resistive layer 14 is obtained by drape forming or by a technique for placing fibers on the assembly of the first and second cellular structures 18, 20, of the reinforcement 34 and of the third, acoustically resistive layer 22. The second part 40 of the first layer 14 is produced by drape forming or by a technique for placing fibers. It is then attached to the assembly of the first and second cellular structures 18, 20, of the reinforcement 34 and of the third, acoustically resistive layer 22, then connected to the extension 36 of the second, reflective layer 16 and to the first part 38 of the first, acoustically resistive layer 14 in the zone of overlap 42.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic panel comprising
   a first longitudinal edge,
   a first, acoustically resistive layer,
   a second, reflective layer,
   at least first and second cellular structures interposed between the first and second layers, and
   at least a third, acoustically resistive layer interposed between the first and second cellular structures,
   the first, acoustically resistive layer and the second, reflective layer being contiguous at the first longitudinal edge,
   the first cellular structure having a first face, a second face that is opposite to the first face and that is in contact with the second, reflective layer, and a first edge face oriented toward the first longitudinal edge of the acoustic panel,
   the second cellular structure comprising a first face in contact with the first, acoustically resistive layer and a second face opposite to the first face, and also first and second edge faces connecting the first and second faces,
   the first edge face of the second cellular structure being oriented toward the first longitudinal edge of the acoustic panel;
   wherein the first cellular structure comprises a set-back portion which extends from the first face in a direction of the second face and which forms a recess dimensioned to accommodate the second cellular structure and the third, acoustically resistive layer, the second cellular structure being positioned in the recess such that the first faces of the first and second cellular structures are coplanar and in contact with the first, acoustically resistive layer, that the first edge faces of the first and second cellular structures are coplanar, and that the second edge face of the second cellular structure is in contact with the set-back portion.

2. The acoustic panel as claimed in claim 1, wherein the acoustic panel comprises at least one reinforcement interposed between the first, acoustically resistive layer and the second, reflective layer, between the first longitudinal edge of the acoustic panel and the first edge faces of the first and second cellular structures, the reinforcement having a first surface extending in a plane common to the first face of the second cellular structure, a second surface extending in a plane common to the second face of the first cellular structure, a third surface in contact with the first edge faces of the first and second cellular structures, and a fourth, inclined surface connecting the first and second surfaces.

3. The acoustic panel as claimed in claim 2, wherein the first surface has a transverse dimension greater than 1 cm and smaller than 5 cm.

4. The acoustic panel as claimed in claim 2, wherein the reinforcement is a cellular structure which has cells opening out at the first and second surfaces of the reinforcement.

5. The acoustic panel as claimed in claim 4, wherein the cells of the reinforcement have a cross section smaller than that of the first and second cellular structures.

6. The acoustic panel as claimed in claim 5, wherein the cells of the reinforcement have a width of between 3 and 6 mm.

7. The acoustic panel as claimed in claim 2, wherein the second, reflective layer comprises an extension which extends beyond the second surface of the reinforcement.

8. The acoustic panel as claimed in claim 7, wherein the first layer extends continuously over the first and second cellular structures, the fourth surface of the reinforcement and the extension of the second, reflective layer.

9. The acoustic panel as claimed in claim 7, wherein the first layer comprises a first, acoustically resistive part which extends over the first and second cellular structures and at least partially over the first surface of the reinforcement, and a second part which extends at least partially over the first surface of the reinforcement, over the fourth surface of the reinforcement and over the extension of the reflective layer, the first and second parts having a zone of overlap in line with the first surface of the reinforcement.

10. The acoustic panel as claimed in claim 1, wherein the first and second cellular structures have cells having a width greater than or equal to 12.7 mm.

11. An aircraft comprising at least one acoustic panel as claimed in claim 1.

* * * * *